United States Patent
Lee et al.

(10) Patent No.: US 8,898,521 B2
(45) Date of Patent: Nov. 25, 2014

(54) METHOD AND APPARATUS FOR BOOTING AN IMAGE REPRODUCTION APPARATUS

(75) Inventors: Jae-woo Lee, Anyang-si (KR);
Seung-bong Han, Suwon-si (KR);
Sun-woo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 997 days.

(21) Appl. No.: 12/649,812

(22) Filed: Dec. 30, 2009

(65) Prior Publication Data
US 2011/0037993 A1    Feb. 17, 2011

(30) Foreign Application Priority Data
Aug. 13, 2009   (KR) .................. 10-2009-0074881

(51) Int. Cl.
*G06F 11/00* (2006.01)
*H04N 21/443* (2011.01)
*G06F 9/44* (2006.01)
*H04N 5/63* (2006.01)

(52) U.S. Cl.
CPC ............. *H04N 5/63* (2013.01); *H04N 21/4436* (2013.01); *G06F 9/4418* (2013.01)
USPC .......................................................... 714/22

(58) Field of Classification Search
USPC .......................................................... 714/22
See application file for complete search history.

(56) References Cited

U.S. PATENT DOCUMENTS

| 5,237,699 | A  | * | 8/1993  | Little et al. ..................... 714/23 |
| 6,378,068 | B1 | * | 4/2002  | Foster et al. .................... 713/1 |
| 6,721,892 | B1 | * | 4/2004  | Osborn et al. ................. 713/300 |
| 7,836,293 | B1 | * | 11/2010 | Wynia ............................ 713/2 |
| 2003/0182590 | A1 | * | 9/2003 | Neuman et al. .............. 713/300 |
| 2006/0090088 | A1 | * | 4/2006 | Choi et al. .................... 713/300 |
| 2010/0174934 | A1 | * | 7/2010 | Zhao et al. .................... 713/324 |

\* cited by examiner

*Primary Examiner* — Jigar Patel
(74) *Attorney, Agent, or Firm* — Sughrue Mion, PLLC

(57) ABSTRACT

An image reproduction apparatus including a power control unit detecting whether an error has occurred in supplying power to the image reproduction apparatus; and a booting control unit selectively cold-booting the image reproduction apparatus based on the detection of whether the error with supplying the power has occurred.

19 Claims, 4 Drawing Sheets

METHOD AND APPARATUS FOR BOOTING AN IMAGE REPRODUCTION APPARATUS

CROSS-REFERENCE TO RELATED PATENT APPLICATION

This application claims the benefit of priority from Korean Patent Application No. 10-2009-0074881, filed on Aug. 13, 2009, in the Korean Intellectual Property Office, the disclosure of which is incorporated herein by reference in its entirety.

BACKGROUND

1. Field

Methods and apparatuses consistent with the disclosed embodiments relate to booting an image reproduction apparatus, and more particularly, to restarting an image reproduction apparatus when an error has occurred during a booting process.

2. Description of the Related Art

Many consumer electronic (CE) devices operate in a suspended mode when powered off in order to control power consumption and allow prompt booting thereof. The suspended mode is referred to as a sleep mode. When a CE apparatus receives a power-on signal, the CE apparatus is returned to an original state, i.e. is resumed.

SUMMARY

One or more embodiments provide a method and an apparatus for restarting an image reproduction apparatus from a suspended mode by detecting an error in a stable supply of power.

A method and an apparatus are provided for restarting an image reproduction apparatus by detecting that there is an error in a memory that stores the necessary information when the image reproduction apparatus resumes operations from the suspended mode.

According to an aspect of the disclosure, there is provided an image reproduction apparatus including: a power control unit detecting whether an error has occurred in supplying power to the image reproduction apparatus; and a booting control unit selectively cold-booting the image reproduction apparatus based on the detection of whether the error with the power has occurred.

The power control unit may detect whether the error with the power has occurred in a suspended mode.

The booting control unit may receive a power-on signal with respect to the image reproduction apparatus from the outside in the suspended mode and determine whether to resume operations of the image reproduction apparatus or cold-boot the image reproduction apparatus.

The booting control unit may determine whether to resume operations of the image reproduction apparatus or cold-boot the image reproduction apparatus according to a flag.

The image reproduction apparatus may further include: a CPU transmitting a signal indicating that the image reproduction apparatus resumed operations to the booting control unit if the image reproduction apparatus resumed operations, wherein, if the booting control unit fails to receive the signal indicating that the image reproduction apparatus has resumed operations from the CPU within a predetermined period of time, the booting control unit cold-boots the image reproduction apparatus.

According to another aspect of the disclosure, there is provided an image reproduction apparatus including: a memory storing a boot image; a CPU loading the boot image when the image reproduction apparatus resumes operations from a suspended mode; and a booting control unit, if the CPU fails to load the boot image, selectively cold-booting the image reproduction apparatus.

The CPU may transmit a signal indicating that the image reproduction apparatus has resumed operations from the suspended mode to the booting control unit if the image reproduction apparatus has resumed operations from the suspended mode, wherein, if the booting control unit fails to receive the signal indicating that the image reproduction apparatus resumed operations from the suspended mode within a predetermined period of time, the booting control unit cold-boots the image reproduction apparatus.

According to another aspect of the disclosure, there is provided an image reproduction apparatus including: a CPU transmitting a signal indicating that the image reproduction apparatus resumed operations from a suspended mode if the image reproduction apparatus resumed operations; and a booting control unit cold-booting the image reproduction apparatus if the booting control unit fails to receive the signal indicating that image reproduction apparatus resumed operations from the CPU within a predetermined period of time.

According to another aspect of the disclosure, there is provided a method of booting an image reproduction apparatus, the method including: detecting whether an error has occurred in supplying power to the image reproduction apparatus; and selectively cold-booting the image reproduction apparatus based on the detecting of whether the error with the power has occurred.

The image reproduction apparatus may further include: before the detecting, receiving a power-on signal with respect to the image reproduction apparatus from the outside when the image reproduction apparatus is in the suspended mode; and after receiving the power-on signal, determining whether to resume operations or cold-boot the image reproduction apparatus.

According to another aspect of the present disclosure, there is provided a computer readable recording medium having recorded thereon the method of booting an image reproduction apparatus, the method including: detecting whether an error has occurred in supplying power to the image reproduction apparatus; and selectively cold-booting the image reproduction apparatus based on the detecting of whether the error with the power has occurred.

BRIEF DESCRIPTION OF THE DRAWINGS

The above and/or other features and aspects will become more apparent by describing in detail exemplary embodiments thereof with reference to the attached drawings in which.

DETAILED DESCRIPTION OF EXEMPLARY EMBODIMENTS

In a suspended mode, an image reproduction apparatus is not entirely powered off but the power is significantly reduced and power consumption thereof is minimized. In the suspended mode, some of the hardware drivers of the image reproduction apparatus are powered off or have a minimum power consumption status. For example, in the suspended mode, a display, a speaker, a system on chip (SoC), etc. of the image reproduction apparatus, such as a television, are powered off, and a memory for performing a self-refresh operation and a unit for performing a resume operation remain operational.

A resume operation means returning the image reproduction apparatus from a suspended mode back to a previous mode, i.e. a normal mode.

When an image reproduction apparatus is entirely powered off, the image reproduction apparatus is powered on again and is booted by cold booting operation means. In more detail, the image reproduction apparatus is generally booted after it was reset. To perform the cold booting operation, the image reproduction apparatus receives a power-on key input relating to the cold booting, also a boot code stored in a flash memory is moved to a DRAM, and the boot code and a boot image are loaded.

An exemplary embodiment will now be described more fully with reference to the accompanying drawings.

Figure 1:
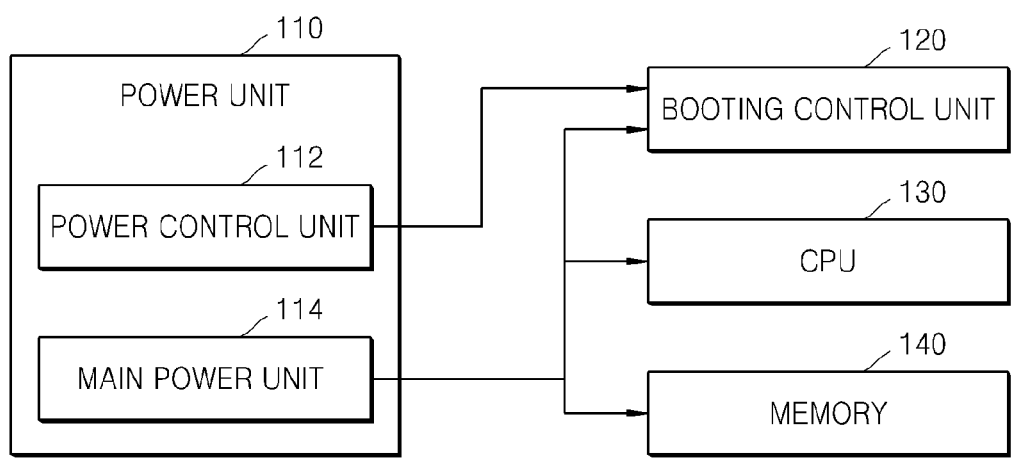
FIG. 1 is a block diagram illustrating an image reproduction apparatus according to an exemplary embodiment.

FIG. 1 is a block diagram of an image reproduction apparatus according to an exemplary embodiment. Referring to FIG. 1, the image reproduction apparatus includes a power unit 110, a booting control unit 120, a CPU 130, and a memory 140. The power unit 110 includes a power control unit 112 and a main power unit 114.

The main power unit 114 supplies power to each unit included in the image reproduction apparatus. The main power unit 114 supplies power to the booting control unit 120 and the memory 140 in a suspended mode. An architect of the system can change the units to which the main power unit 114 supplies power.

During a resume operation and a cold booting operation, the main power unit 114 supplies power to the booting control unit 120, the CPU 130, the memory 140, and other operating units (not shown).

The power control unit 112 detects whether an error has occurred in the power supplied to the booting control unit 120 and the memory 140 from the main power unit 114 in the suspended mode. In more detail, the power control unit 112 determines whether a rated voltage is supplied to the booting control unit 120 and the memory 140. When the power control unit 112 detects that the error with the power has occurred, the power control unit 112 transmits a signal indicating that the error with the power has occurred to the booting control unit 120. For example, the main power unit 114 supplies 1.8V to the booting control unit 120 and the memory 140. When the main power unit 114 fails to supply 1.8V to the booting control unit 120 and the memory 140, the booting control unit 120 and the memory 140 cease normal operations. In particular, the memory 140 does not perform a self-refresh operation. When the main power unit 114 supplies a voltage exceeding or less than 1.8V to the booting control unit 120 and the memory 140, the power control unit 112 transmits a signal indicating that the error with the power has occurred to the booting control unit 120 when the image reproduction apparatus is resumed.

The booting control unit 120 controls the resume operation and the cold booting operation. The booting control unit 120 may be included in or excluded from the CPU 130. Alternatively, the CPU 130 may perform the resume operation and the cold booting operation performed by the booting control unit 120.

When the booting control unit 120 receives a power-on signal with respect to the image reproduction apparatus from the outside in the suspended mode, the booting control unit 120 determines whether to resume or cold boot the image reproduction apparatus according to a flag. For example, if the flag is '0', the booting control unit 120 may be configured to resume the image reproduction apparatus, and, if the flag is '1', the booting control unit 120 may be configured to cold-boot the image reproduction apparatus.

When the booting control unit 120 begins to resume the operations, the booting control unit 120 receives the signal indicating that the error with the power has occurred from the power control unit 112. In this case, the booting control unit 120 restarts the image reproduction apparatus and cold-boots the image reproduction apparatus.

When the image reproduction apparatus resumes operating in the suspended mode, the CPU 130 loads a boot image stored in the memory 140. When the CPU 130 fails to load the boot image, the resume operation is not performed. When the resume operation is performed, the CPU 130 transmits a signal indicating that the resume operation has been completed to the booting control unit 120. If the booting control unit 120 fails to receive the signal indicating that the resume operation has been performed from the CPU 130 within a predetermined period of time, the booting control unit 120 determines that an error with the resume operation has occurred, restarts the image reproduction apparatus, and cold-boots the image reproduction apparatus.

The memory 140 performs a self-refresh operation in the suspended mode. Also, the memory 140 stores the boot image. In an exemplary embodiment, the memory 140 may be a DRAM. However, the present invention is not limited thereto and the memory 140 may store a predetermined type of data. For example, when the memory 140 is a volatile memory, if the power is not supplied to the memory 140, the data stored in the memory 140 is completely erased. As a result, the boot image that is to be used to perform the resume operation is also erased. When the booting control unit 120 or the CPU 130 receives a power-off signal, the booting control unit 120 or the CPU 130 changes the operation mode to the suspended mode. As a result, the booting control unit 120 or the CPU 130 changes the operation mode of the memory 140 to the self-refresh mode. For example, when the memory 140 is a DRAM, if a clock enable (CKE) signal that is input into the DRAM is low, the DRAM automatically operates in the self-refresh mode.

Figure 2:
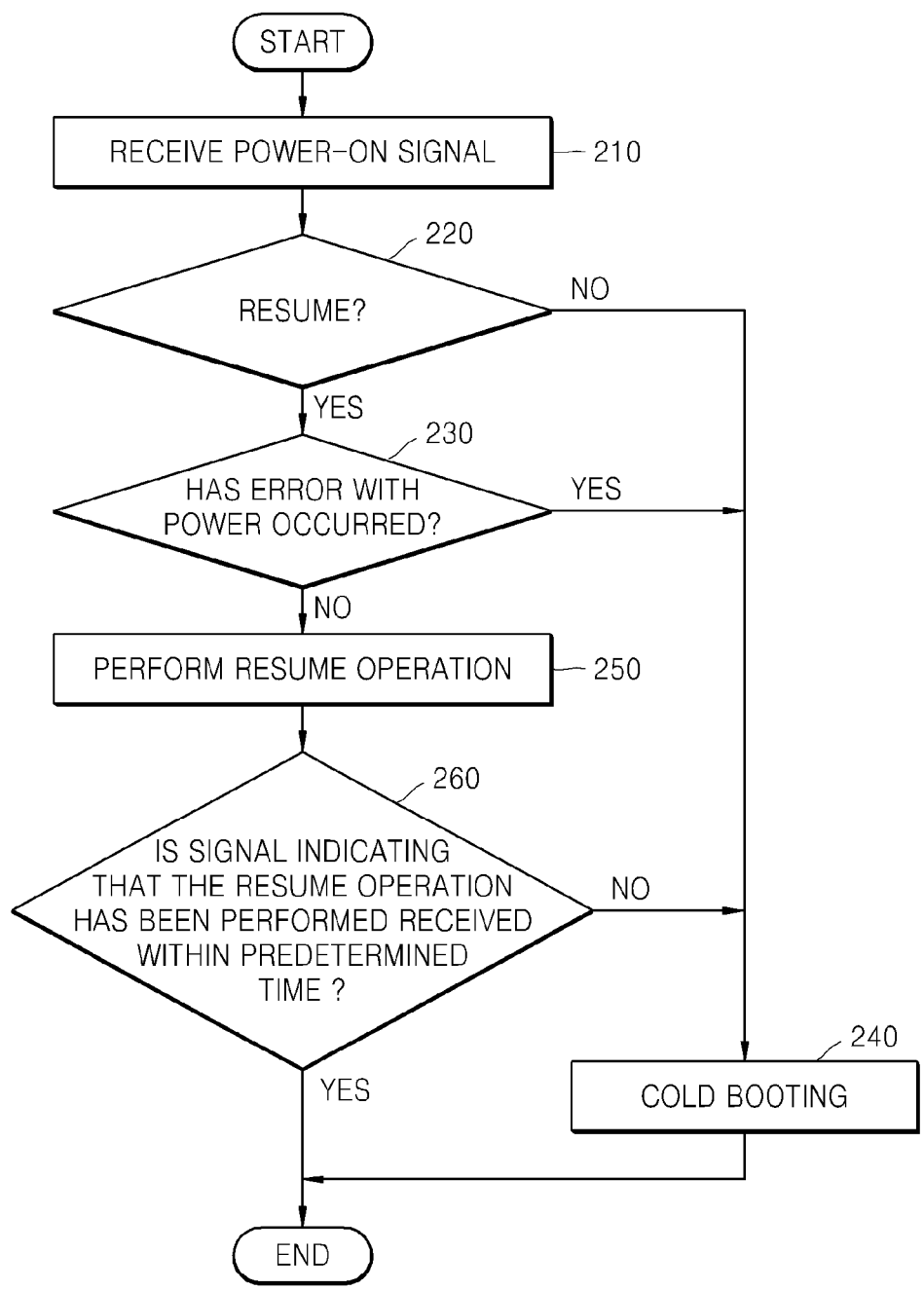
FIG. 2 is a flowchart illustrating a method of booting an image reproduction apparatus according to an exemplary embodiment.

FIG. 2 is a flowchart illustrating a method of booting an image reproduction apparatus according to an exemplary embodiment. Referring to FIG. 2, in operation 210, the image reproduction apparatus receives a power-on signal from the outside.

In operation 220, when the image reproduction apparatus receives the power-on signal in a suspended mode, the image reproduction apparatus determines whether to perform a resume operation or a cold booting operation in the suspended mode. A flag stored in the image reproduction apparatus may be used to perform such a determination. For example, if the flag indicates the resume operation (operation 220—Yes), in operation 230, the image reproduction apparatus performs the resume operation, and, if the flag indicates the cold booting operation (operation 220—No), in operation 240, the image reproduction apparatus performs the cold booting operation.

In operation 230, the image reproduction apparatus detects whether an error has occurred in a power supplied to a unit that operates in the suspended mode. If the image reproduction apparatus detects that the error with the power has occurred (operation 230—Yes), i.e. when a proper voltage is not supplied to the unit in the suspended mode, in operation 240, the image reproduction apparatus performs the cold-booting operation. If the error with the power has occurred in the suspended mode, since a memory does not normally perform a self-refresh operation, the memory does not normally store a boot image. Thus, the image reproduction apparatus does not load the boot image in the resume operation, and thus the resume operation cannot be performed and the cold-booting is necessary. If the image reproduction apparatus detects that there were no errors in power supply (operation 230—No), in operation 250, the image reproduction apparatus performs the resume operation.

In operation 260, when the resume operation is completed, the image reproduction apparatus receives a signal indicating that the resume operation has been performed. If the image reproduction apparatus fails to receive the signal indicating that the resume operation has been performed within a predetermined period of time (operation 260—No), the image reproduction apparatus proceeds to operation 240. If the image reproduction apparatus receives the signal indicating that the resume operation is completed within the predetermined period of time, the resume operation ends.

Figure 3:
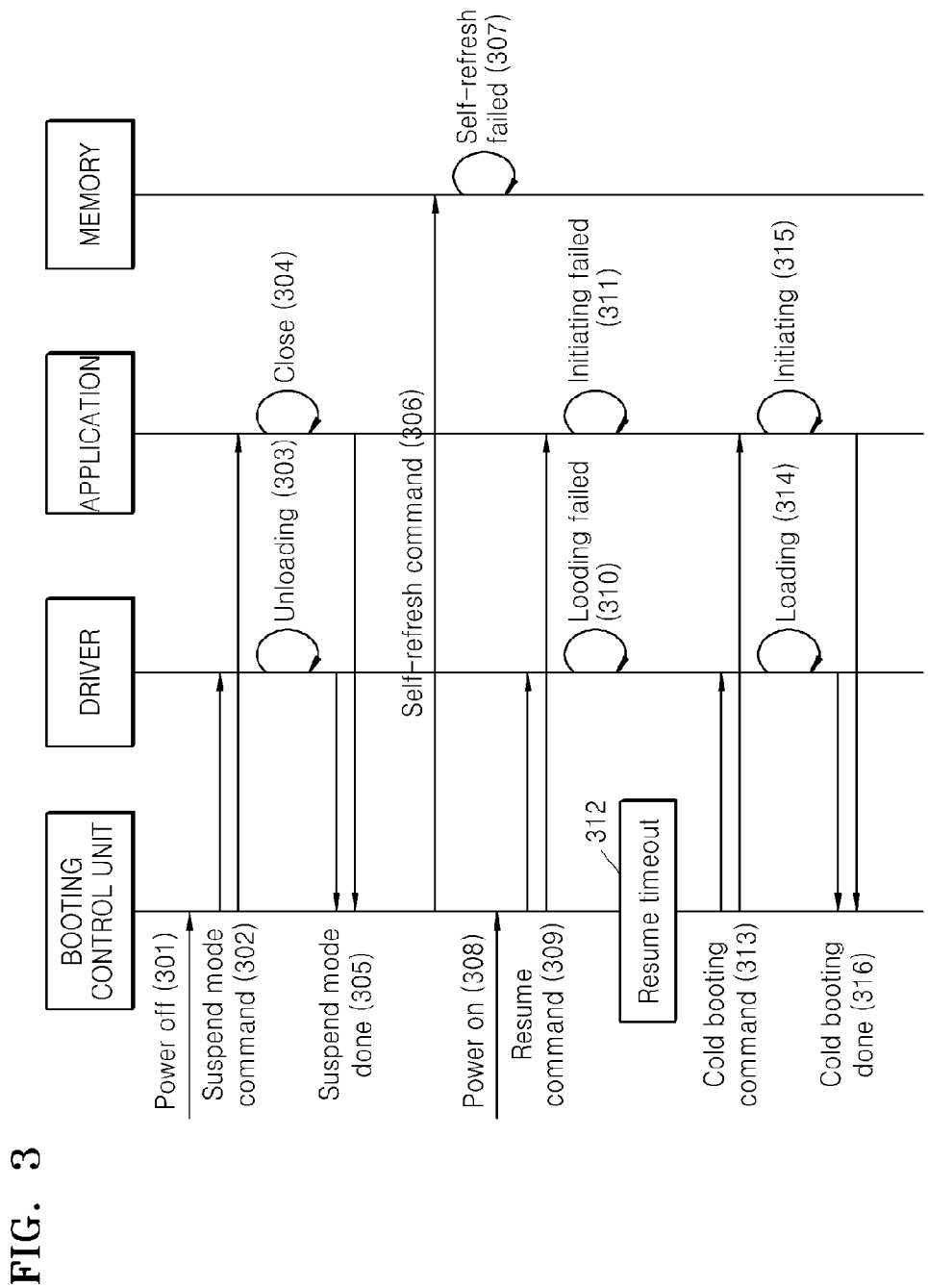
FIG. 3 is a flowchart illustrating a method of booting an image reproduction apparatus according to an exemplary embodiment.

FIG. 3 is a flowchart illustrating a method of booting an image reproduction apparatus according to an exemplary embodiment. Referring to FIG. 3, in operation 301, a booting control unit of the image reproduction apparatus that is normally operating receives a power-off signal from the outside.

In operation 302, the booting control unit generates a suspend mode command and transmits the suspend mode command to a driver and an application.

In operation 303, the driver is unloaded so as to not operate. In operation 304, the application is closed.

In operation 305, the image reproduction apparatus enters in a suspend mode. In operation 306, the booting control unit transmits a self-refresh command to a memory.

In operation 307, the memory fails to perform the self-refresh operation. If the memory is a volatile memory and fails to perform the self-refresh operation, i.e. if power is not supplied to the memory, data stored in the memory is entirely lost. In this case, a boot image is lost. When the boot image is lost, a resume operation will not be performed. Therefore, the memory needs to perform the self-refresh operation in order to be able to perform the resume operation.

In operation 308, the booting control unit receives a power-on signal with respect to the image reproduction apparatus.

In operation 309, the booting control unit generates a resume command and transmits the resume command to the driver and the application.

In operation 310, the loading of the driver fails. When the image reproduction apparatus is resumed in the suspend mode, the hardware driver needs to be initialized, i.e. loaded. However, in operation 307, the memory failed to perform the self-refresh operation and thus the image reproduction apparatus cannot perform the resume operation. Thus, the driver cannot load.

In operation 311, the application cannot initialize i.e. start.

In operation 312, the resume timeout occurs. That is, the resume operation is not completed within a predetermined period of time and thus the booting control unit determines that the image reproduction apparatus cannot perform the resume operation and cold-boots the image reproduction apparatus.

In operation 313, the booting control unit generates a cold booting command and transmits the cold booting command to the driver and the application.

In operation 314 through 316, the driver is loaded and the application is initialized and thus the cold booting operation is performed.

Figure 4:
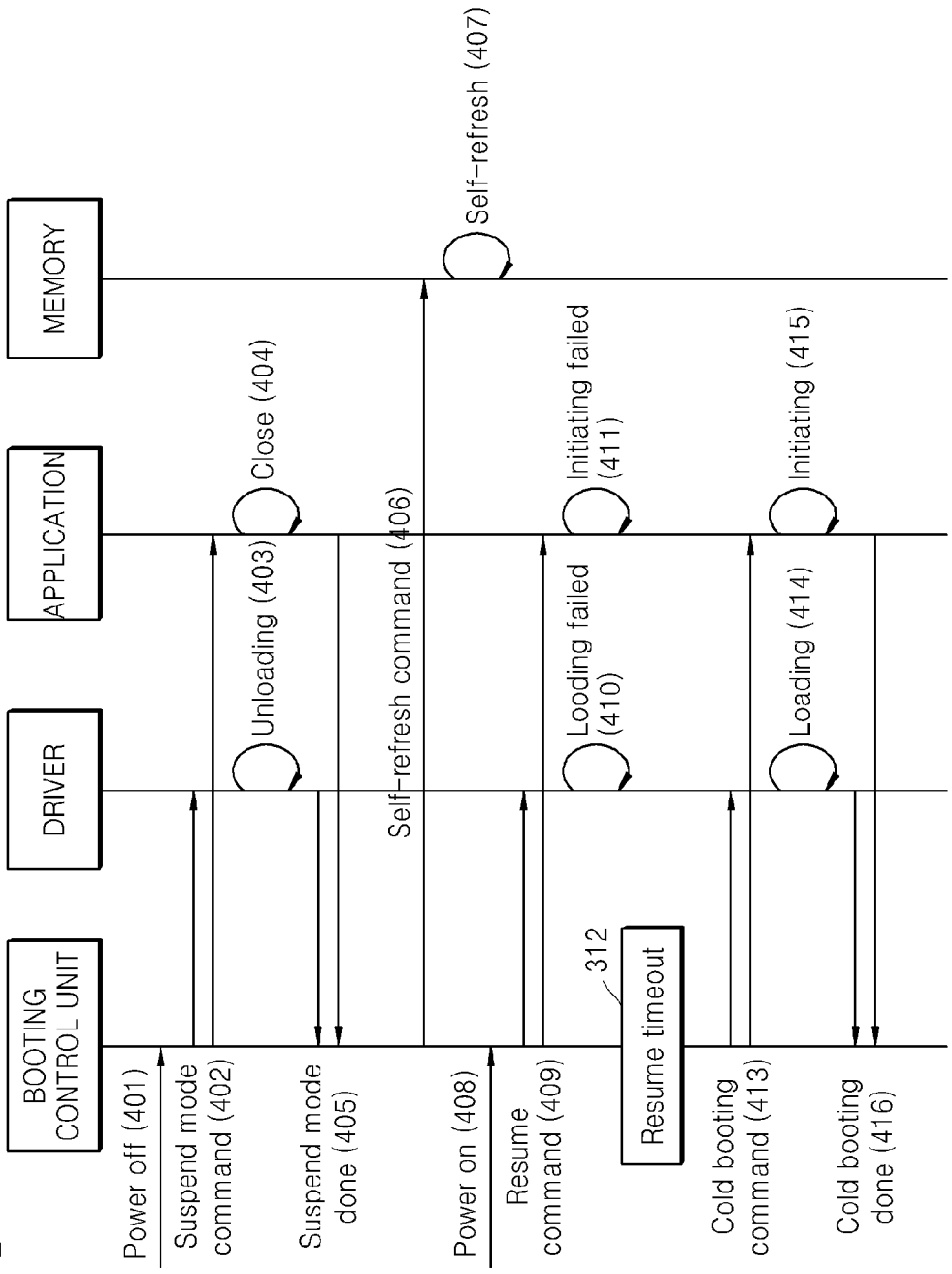
FIG. 4 is a flowchart of a method of booting an image reproduction apparatus according to an exemplary embodiment.

FIG. 4 is a flowchart illustrating a method of booting an image reproduction apparatus according to an embodiment.

The method of booting the image reproduction apparatus according to an exemplary embodiment is different from the exemplary method described above with reference to FIG. 3 in that a memory successfully performs a self-refresh operation. However, in operation 410 or 411, a driver or an application fails to load or initialize and thus a resume operation cannot be performed. The other description of the method of booting the image reproduction apparatus of an exemplary embodiment is analogous to the description above with reference to FIG. 3 and thus the detailed description thereof will not be repeated.

The present invention can also be embodied as computer readable code on a computer readable recording medium. The computer readable recording medium is any data storage apparatus that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed network coupled computer systems so that the computer readable code is stored and executed in a distributed fashion. Also, functional programs, code and code segments for accomplishing the present invention can be easily construed by programmer skilled in the art to which the present invention pertains.

While exemplary embodiments have been particularly shown and described, it will be understood by one skilled in the art that various changes in form and details may be made therein without departing from the spirit and scope of the invention as defined by the appended claims. The \exemplary embodiments should be considered in descriptive sense only and not for purposes of limitation. Therefore, the scope of the invention is defined not by the detailed description of the exemplary embodiments but by the appended claims, and all differences within the scope will be construed as being included in the present invention.

What is claimed is:

1. An image reproduction apparatus comprising:
    a power control unit which detects whether an error has occurred in supplying power to the image reproduction apparatus while the image reproduction apparatus is in a suspended mode and which is configured to set a flag to a predetermined value if the error is detected; and
    a booting control unit which selectively performs cold-booting of the image reproduction apparatus based on the set flag,
    wherein in response to receiving a power-on signal with respect to the image reproduction apparatus from an outside in the suspended mode, the booting control unit determines to perform the cold-booting of the image reproduction apparatus without trying to resume operations of the image reproduction apparatus if the flag has been set while in the suspended mode, by the power control unit, to the predetermined value indicating that the error has been detected in the suspended mode,
    wherein if the flag is not set to the predetermined value, the image reproduction apparatus tries to resume operations and boot an image when the power-on signal is received, and
    wherein the booting control unit aborts the resumption of operation and cold-boots the image reproduction apparatus if the booting control unit fails to receive the signal indicating that the image reproduction apparatus resumed the operations within a predetermined period of time.

2. The image reproduction apparatus of claim 1, wherein in response to receiving the power-on signal with respect to the image reproduction apparatus from the outside in the suspended mode, the booting control unit determines to resume operations of the image reproduction apparatus if the occurrence of the error has not been detected by the power control unit.

3. The image reproduction apparatus of claim 2, further comprising: a control processing unit which transmits a signal indicating that the image reproduction apparatus resumed operations to the booting control unit if the image reproduction apparatus resumed the operations.

4. The image reproduction apparatus of claim 1, further comprising:
a memory which stores boot control code and a boot image; and
a main power unit which supplies power to the memory and the booting control unit,
wherein the power control unit detects that the error has occurred in supplying power to the image reproduction apparatus while the image reproduction apparatus is in the suspended mode if the main power unit supplies voltage exceeding or less than a predetermined value to at least one of the memory and the booting control unit while in the image reproduction apparatus is in a suspended mode.

5. The image reproduction apparatus of claim 4, wherein the power control unit sets the flag to the predetermined value when the error in the voltage is detected and wherein if the flag is set to the predetermined value, the booting control unit determines to cold-boot the image reproduction apparatus without trying to resume operation when the power-on signal is received.

6. The image reproduction apparatus of claim 5, wherein:
if during the resumption of operation of the image reproduction apparatus, the booting control unit received the signal indicating that the boot image cannot be loaded from the memory, the booting control unit aborts the resumption of operation and cold-boots the image reproduction apparatus, and
if after the boot image is loaded from the memory, the boot control unit does not receive a signal indicating that the operation of the image reproduction apparatus is resumed within a predetermined time period, the booting control unit cold-boots the image reproduction apparatus at an expiration of the predetermined time period.

7. An image reproduction apparatus comprising:
a memory, which stores a boot image;
a control processing unit, which, while the image reproduction apparatus is in a suspended mode, sets a flag to a predetermined value indicating that an error has been detected while the image reproduction apparatus is in the suspended mode and which loads the boot image if the image reproduction apparatus resumes operation from a suspended mode and if the flag is not set to the predetermined value; and
a booting control unit which selectively cold-boots the image reproduction apparatus if the control processing unit fails to load the boot image,
wherein, in response to receiving a power-on signal with respect to the image reproduction apparatus from an outside in the suspended mode, the booting control unit determines to perform the cold-booting of the image reproduction apparatus without trying to resume operations of the image reproduction apparatus if the control processing unit fails to load the boot image and if the flag is set to the predetermined value, and
wherein if the image reproduction apparatus tries to resume operations from the suspended mode and the booting control unit fails to receive the signal indicating that the image reproduction apparatus resumed the operations within a predetermined period of time, the booting control unit aborts the resumption of operation and cold-boots the image reproduction apparatus.

8. The image reproduction apparatus of claim 7, wherein the control processing unit transmits a signal indicating that the image reproduction apparatus resumed operations from the suspended mode to the booting control unit if the image reproduction apparatus resumed the operation from the suspended mode,
wherein, if the booting control unit fails to receive the signal indicating that the image reproduction apparatus resumed the operations from the suspended mode within a predetermined period of time, the booting control unit cold-boots the image reproduction apparatus.

9. The image reproduction apparatus of claim 7, wherein, if after the boot image is loaded from the memory, the boot control unit does not receive a signal indicating that the operation of the image reproduction apparatus is resumed within a predetermined time period, the booting control unit cold-boots the image reproduction apparatus at an expiration of the predetermined time period.

10. The image reproduction apparatus of claim 7, wherein:
the memory is a volatile memory that performs a self-refresh operation while the image reproduction apparatus is in the suspended mode,
in the suspended mode, an application of the image reproduction apparatus is closed and a driver is unloaded so as to not operate, and
wherein, if the self-refresh operation is performed but the driver cannot be loaded when the power-on signal is received, the booting control unit determines to perform the cold-booting operation.

11. An image reproduction apparatus comprising:
a control processing unit which transmits a signal indicating that the image reproduction apparatus resumed operations from a suspended mode if the image reproduction apparatus resumed operations; and
a booting control unit which cold-boots the image reproduction apparatus if the booting control unit fails to receive the signal indicating that the image reproduction apparatus resumed operations from the control processing unit within a predetermined period of time,
wherein in response to receiving a power-on signal with respect to the image reproduction apparatus from an outside in the suspended mode, the booting control unit determines to perform the cold-booting of the image reproduction apparatus without trying to resume operations of the image reproduction apparatus if the booting control unit fails to receive from the control processing unit the signal indicating that the image reproduction apparatus resumed operations, within the predetermined period of time,
wherein the image reproduction apparatus determines whether, while the image reproduction apparatus is in a suspended mode, a flag is set to a predetermined value indicating that an error was detected while the image reproduction apparatus is in the suspended mode,
wherein, if the flag is set to the predetermined value, the image reproduction apparatus performs the cold-booting without trying to resume the operations when recovering from the suspended mode, and wherein, if the flag is not set to the predetermined value, the image reproduction apparatus tries to resume operations when the power-on signal is received, and if the booting control unit fails to receive the signal indicating that the image reproduction apparatus resumed the operations within a predetermined period of time, the booting control unit aborts the resumption of operation and cold-boots the image reproduction apparatus.

12. The image reproduction apparatus of claim 11, wherein, if after the boot image is loaded from the memory, the boot control unit does not receive a signal indicating that the operation of the image reproduction apparatus is resumed within a predetermined time period, the booting control unit cold-boots the image reproduction apparatus at an expiration of the predetermined time period.

13. A method of booting an image reproduction apparatus, the method comprising:
   detecting whether an error has occurred in supplying power to the image reproduction apparatus while the image reproduction apparatus is in a suspended mode;
   while the image reproduction apparatus is in the suspended mode, setting a flag to a predetermined value if the error is detected; and
   selectively cold-booting the image reproduction apparatus based on the set flag,
   wherein in response to receiving a power-on signal with respect to the image reproduction apparatus from an outside in the suspended mode, performing the cold-booting of the image reproduction apparatus without trying to resume operations of the image reproduction apparatus if the flag has been set to the predetermined value indicating that the error has been detected in the suspended mode,
   wherein if the flag is not set to the predetermined value, when the power-on signal is received, the image reproduction apparatus tries to resume operations and boot a boot image, and
   wherein if the image reproduction apparatus tries to resume operations and the booting control unit fails to receive the signal indicating that the image reproduction apparatus resumed the operations within a predetermined period of time, the booting control unit aborts the resumption of operation and cold-boots the image reproduction apparatus.

14. The method of claim 13, further comprising:
   if the error with the power has not occurred in the suspended mode, resuming operations of the image reproduction apparatus; and
   if the image reproduction apparatus resumed operations and a signal indicating that operations of the image reproduction apparatus are resumed is not received within a predetermined period of time, cold-booting the image reproduction apparatus.

15. A method of booting an image reproduction apparatus, the method comprising:
   setting a flag to a predetermined value while the image reproduction apparatus is in a suspended mode if an error is detected indicating an interruption in a power supply to a memory of the image reproduction apparatus while the image reproduction apparatus is in the suspended mode;
   if the image reproduction apparatus resumes operations from a suspended mode when the flag is not set to the predetermined value, loading a boot image; and
   if the booting control unit fails to receive the signal indicating that the image reproduction apparatus resumed the operations within a predetermined period of time, cold-booting the image reproduction apparatus,
   wherein in response to receiving a power-on signal with respect to the image reproduction apparatus from an outside which is in the suspended mode, determines to perform the cold-booting of the image reproduction apparatus without trying to resume operations of the image reproduction apparatus based on the flag being set to the predetermined value and based on whether the loading of the boot image fails.

16. The method of claim 15, wherein the cold-booting the image reproduction apparatus comprises: if a signal indicating that the image reproduction apparatus resumed operations from the suspended mode is not received within a predetermined period of time, cold-booting the image reproduction apparatus.

17. The method of claim 15, wherein if the error is not detected while the image reproduction apparatus is in the suspended mode, resuming operations of the image reproduction apparatus in response to receiving the power-on signal.

18. A non-transitory computer readable recording medium having recorded thereon a method of booting an image reproduction apparatus, the method comprising:
   detecting whether an error has occurred in supplying power to the image reproduction apparatus while the image reproduction apparatus is in a suspended mode;
   while the image reproduction apparatus is in the suspended mode, setting a flag to a predetermined value if the error is detected; and
   selectively cold-booting the image reproduction apparatus based on the set flag,
   wherein in response to receiving a power-on signal with respect to the image reproduction apparatus from an outside in the suspended mode, performing the cold-booting of the image reproduction apparatus without trying to resume operations of the image reproduction apparatus if the flag has been set to the predetermined value,
   wherein if the flag is not set to the predetermined value, when the power-on signal is received, the image reproduction apparatus tries to resume operations and boot an image, and
   wherein if during the resumption operation, the booting control unit fails to receive the signal indicating that the image reproduction apparatus resumed the operations within a predetermined period of time, the booting control unit aborts the resumption of operation and cold-boots the image reproduction apparatus.

19. An image reproduction apparatus comprising:
   a power control unit which detects whether an error has occurred in supplying power to the image reproduction apparatus while the image reproduction apparatus is in a suspended mode;
   a booting control unit which selectively performs cold-booting of the image reproduction apparatus based on whether occurrence of the error has been detected by the power control unit;
   a memory which stores boot control code and a boot image; and
   a main power unit which supplies power to the memory and the booting control unit,
   wherein the power control unit detects that the error has occurred in supplying power to the image reproduction apparatus while the image reproduction apparatus is in the suspended mode if the main power unit supplies voltage exceeding or less than a predetermined value to at least one of the memory and the booting control unit while in the image reproduction apparatus is in a suspended mode, wherein in response to receiving a power-on signal with respect to the image reproduction apparatus from an outside in the suspended mode, the booting control unit determines to perform the cold-booting of the image reproduction apparatus without trying to resume operations of the image reproduction apparatus if the occurrence of the error has been detected by the power control unit, wherein the power control unit sets a flag to a predetermined value when the error in the voltage is detected and wherein if the flag is set to the predetermined value, the booting control unit determined to cold-boot the image reproduction apparatus without trying to resume operation when the power-on signal is received, wherein:
- the memory is a volatile memory that performs a self-refresh operation while the image reproduction apparatus is in the suspended mode,
- in the suspended mode, an application of the image reproduction apparatus is closed and a driver is unloaded so as to not operate, and
- wherein if the self-refresh operation is performed but the driver cannot be loaded when the power-on signal is received, the booting control unit determines to perform the cold-booting operation.

\* \* \* \* \*